Oct. 9, 1934.    H. FORD    1,975,837
INTERNAL COMBUSTION ENGINE
Filed Nov. 1, 1932    2 Sheets-Sheet 1
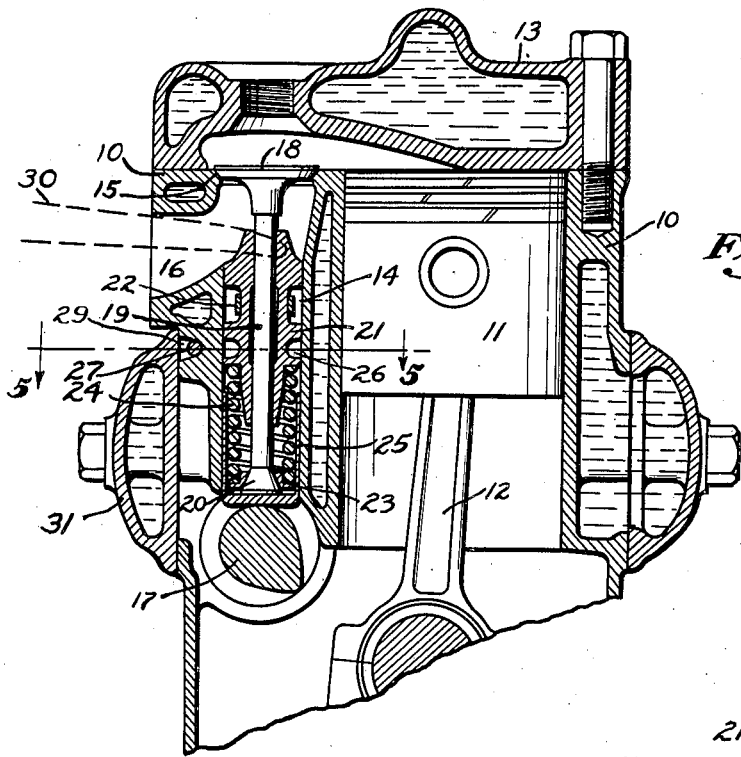
Fig. 1.
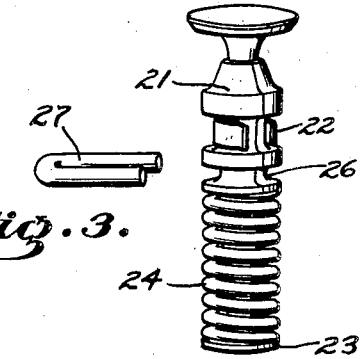
Fig. 2.
Fig. 3.
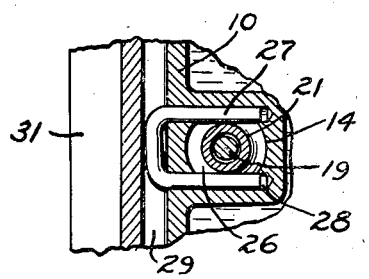
Fig. 5.
Fig. 4.
INVENTOR.
Henry Ford.
BY
ATTORNEY.

Oct. 9, 1934.                H. FORD                1,975,837
                    INTERNAL COMBUSTION ENGINE
                    Filed Nov. 1, 1932        2 Sheets-Sheet 2
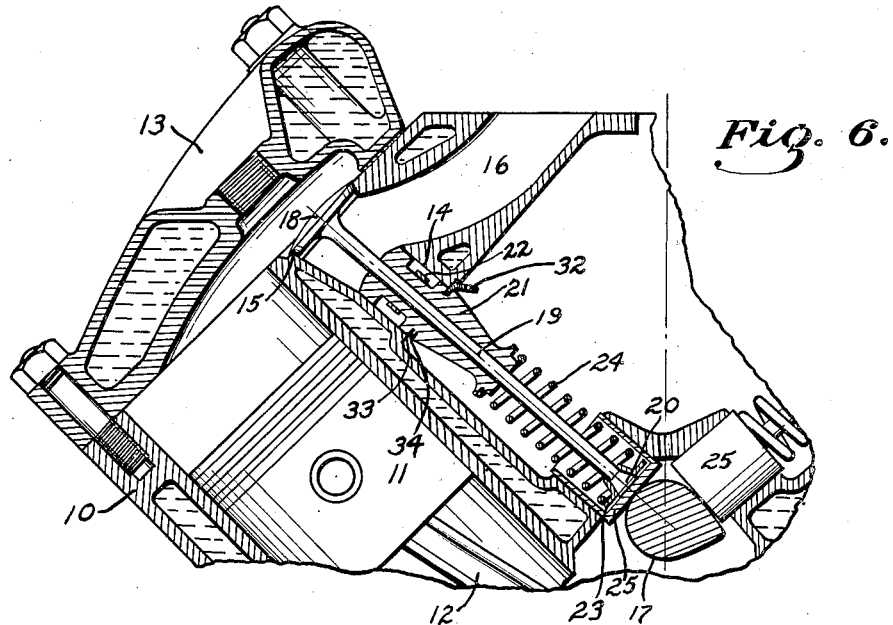
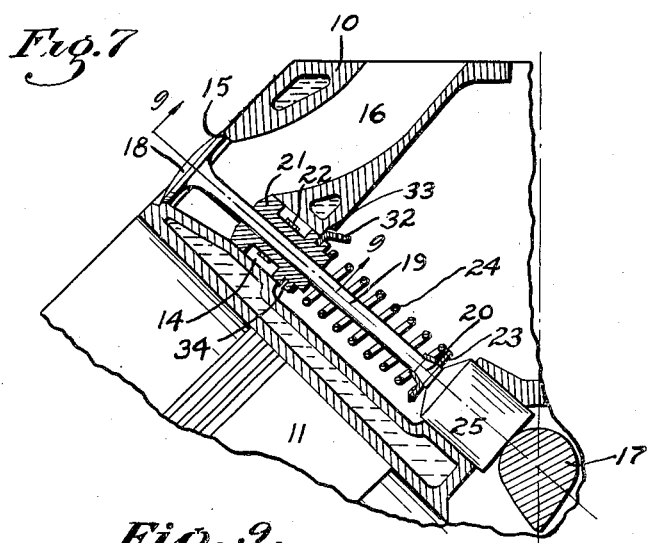
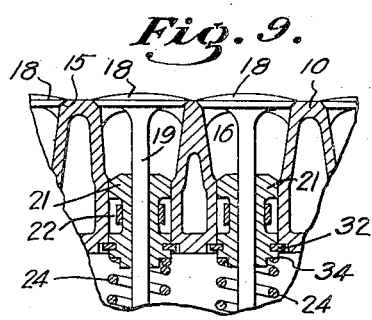
INVENTOR.
Henry Ford.
BY
ATTORNEY.

Patented Oct. 9, 1934

1,975,837

UNITED STATES PATENT OFFICE 1,975,837

INTERNAL-COMBUSTION ENGINE

Henry Ford, Dearborn, Mich., assignor to Ford Motor Company, Dearborn, Mich., a corporation of Delaware Application November 1, 1932, Serial No. 640,678

9 Claims. (Cl. 123—188)

The object of my invention is to provide an internal-combustion engine having a novel valve arrangement therein, whereby both the initial cost and the cost of servicing the engine is reduced. The valve arrangement used is of the poppet type, the valves operating when installed the same as the conventional poppet valve arrangement. The important improvement of my valve mechanism is in its ease of assembly in the motor.

Heretofore in all engines of the T head type, the assembling of the valves in the engine block has been a rather awkward operation. It was believed always necessary to assemble the valve stem through the cylinder block or valve bushing therein and to then insert the valve spring over the end of the stem and finally after compressing the valve spring insert a spring washer and valve spring retaining member on the stem to retain the valve in position. The compressing of the valve spring and assembling of the washer thereon required the use of a spring compressing tool and at the best was an operation requiring considerable skill. The foregoing difficulty was increased when assembling V type engines wherein the chamber between the two cylinder blocks formed the valve chamber. In such engines the installation of the valves in the limited space available was very difficult, so that the cost of regrinding such valves was excessive.

With my improved device the valve, valve guide bushing, valve spring and spring washer are assembled into a single unit outside of the engine, preferably on a work bench or the like, and then these units are inserted into suitable bores in the cylinder block from the valve seat side thereof. For the reason that the valve spring is compressed and the retaining washer installed on the valve stem before the installation of the unit in the block, the awkward operation of installing such valves is eliminated.

A further object of my invention is to provide an engine having exceptionally short valve stems while still providing valve stem bushings of adequate length to insure accurate alignment of the valves. An important feature resulting from the use of my device is that the tappet used with my valve assembly may be telescoped over the lower end of the valve and valve spring to thereby shorten the distance between the cam shaft and valve head without sacrificing the desirable bearing length on either the tappet or valve stem. Thus, the cylinder blocks may be of less length thereby reducing the weight of the motor. Such an arrangement is not possible in the conventional engine because it would be impossible to assemble the valve spring retaining washer in place with a valve tappet telescoped over the lower end of the valve.

With these and other objects in view, my invention consists in the arrangement, construction and combination of the various parts of my improved device, as described in the specification, claimed in my claims, and illustrated in the accompanying drawings, in which:

Figure 1 shows a vertical transverse sectional view through the upper portion of an automobile engine, having my improved valve mechanism installed therein.

Figure 2 shows a perspective view of my valve, valve bushing, valve spring and spring retaining washer assembly, illustrating the unit which is adapted to be inserted into the cylinder block of an engine.

Figure 3 shows a perspective view of a U shaped clip adapted to lock the assembly shown in Figure 2 in the cylinder block.

Figure 4 shows a perspective view of the valve tappet which is used in the engine shown in Figure 1 and with the unit shown in Figure 2.

Figure 5 shows a sectional view taken on the line 5—5 of Figure 1.

Figure 6 shows a vertical transverse sectional view through a portion of a Ford V-8 engine, illustrating a form of my device for use on such engines.

Figure 7 shows another sectional view of the Ford V-8 engine, illustrating an adaptation of my improved device used for replacement on said engines, and Figure 8 shows the locking clip used in the devices shown in Figures 6 and 7.

Figure 9 shows a sectional view, taken on the line 9—9 of Figure 8.

Referring to the accompanying drawings, and particularly to Figure 1, I have used the reference numeral 10 to indicate generally a cylinder block of an automobile engine having a conventional piston 11 and connecting rod 12 therein, the piston being reciprocally mounted in a vertical cylinder bore in the block. The block 10 is provided with a pair of vertical valve bores 14 therein spaced alongside of each of the cylinder bores. The inner-section of each of the bores 14 with the upper face of the cylinder block is machined to form valve seats 15 of the engine. Valve ports 16 are cored in the block 10 just beneath each of the valve seats 15, whereby intake and exhaust gases may be drawn into or discharged from the engine through the valve seats 15 in the conventional manner. A cylinder head 13 is secured over the valve bores 14 and cylinder bores and a cam shaft 17 is rotatably mounted parallel to the engine crank shaft just beneath the lowermost ends of the bores 14, this cam shaft being driven in the conventional manner through suitable gearing or the like.

My improved valve assembly unit is composed of a valve head 18 adapted to fit the valve seat 15, which head is provided with an integral valve stem 19, the latter having an enlarged conical shaped valve foot 20 formed on its lowermost end. A split bushing 21 is clamped around the valve stem 19 and resiliently retained in position by means of a spring clip 22, the outer diameter of the bushing 21 being adapted to fit one of the vertical bores 14 in the cylinder block. It will be noted that a spring retaining U shaped washer 23 is adapted to fit over the conical foot 20, this washer holding a valve spring 24 in compressed position. The valve spring when assembled in position is compressed between a shoulder on the bushing 21 and the spring washer 23, whereby said valve spring resiliently urges the bushing up against the valve head 18. The construction of the washer 23 and its cooperation with the conical foot 20 is identical to the construction of the washer 8 and foot 9, shown in the United States Patent 1,640,118.

It will readily be seen that the unit, as shown in Figure 2, may be assembled outside of the motor simply by securing the split bushing around the valve stem by means of the spring clip 22, then inserting the stem in the spring 24, and securing the unit together by means of the spring washer 23. There is normally some space between the bushing 21 and the valve head when the unit is assembled in the motor, however, when the unit is outside of the motor the bushing may slide up adjacent to the valve head to thereby lessen the pressure required to compress the valve spring sufficiently to install the washer 23. The bushing, stem and spring may be proportioned so that the valve spring can be compressed sufficiently by the fingers to install the retaining washer. Of course, when the unit is installed in the engine the valve bushing is moved a short distance toward the lower end of the valve stem, thus loading up the valve spring to give the desired valve spring action. These units are adapted to be bodily inserted in the valve bores 14 and are secured therein by means now to be described.

Each of the bushings is provided with an annular groove 26 therein which coacts with a U shaped clip 27, the latter being retained in the cylinder block, or rather inserted through a pair of transverse openings 28 in the block which intersect the opposite sides of each bore 14. The outer ends of each of these openings intersect a longitudinally extending groove 29 cast in the cylinder block. Thus, each clip 27 may be inserted in the pair of openings 28 and if the groove 26 in the valve bushing is aligned with the clip, the bushing will be prevented from axial movement in the bore 14 by said clip.

Before describing the operation of assembling the valve, it may be well to mention that I have provided cup-shaped tappets 25 which are reciprocally mounted in the lower end of the bores 14 and ride on one of the cams of the cam shaft 17 to be thereby reciprocated by the rotation of the cam shaft.

To assemble the valve units in the engine, the valve tappets 25 are first dropped in the vertical bore so as to rest against the cam shaft. Valve assembly units, as shown in Figure 2, are then dropped down on top of the valve tappets. Due to the valve springs 24 forcing the bushings 21 up against the under faces of the valve heads, the grooves 26 in the bushings are located somewhat above the openings 28 in the cylinder block. However, a screw driver or other tool, as shown by dotted lines 30 in Figure 1, is inserted into the ports 16 and the upper end of the valve bushings pried downwardly until the grooves 26 become aligned with the adjacent openings 28. At this time, the U shaped clips 27 may be inserted into the openings 28 so as to project through the adjacent grooves 26, thereby positively preventing the valve springs from moving the valve bushings upwardly after the release of the tool. When the clips 27 are in position, the portion connecting the two parallel arms thereof lies wholly within the groove 29 so that a cover plate 31 may be secured over the side of the motor to prevent the accidental withdrawal of the clips 27 and also to prevent oil leaking from the motor at this point.

When it is desired to remove the valves from the engine, it is only necessary to pry the bushings 21 downwardly a few thousandths of an inch, pull out the clips 27 and then withdraw the valve unit. The important feature is that at no time is it necessary to remove the valve spring retaining washer from the valve stem while the unit is in the motor block.

It will be noted that the cylinder block 10 is provided with a horizontal opening adjacent to the cam shaft 17 which opening is adapted to be closed by the cover plate 31. The purpose of providing such an opening is so that when the valves are being fitted each unit may be dropped in its bore and a feeler gauge, that is a strip of metal the thickness of desired valve clearance, may be inserted between the cam shaft and the valve tappet to accurately ascertain the valve clearance of any particular unit. Further, it will be noted that when regrinding the valves it is not necessary to remove the guide bushings or springs from the units as removing of the clips 27 is sufficient to relieve the tension from the valves so that they may be accurately ground in place.

From the foregoing it will be seen that the tappets 25 extend up over the lower end of the valve stem and valve springs so that the distance between the cam shaft and valve head is materially reduced. This arrangement is made possible because my valve unit may be assembled and then inserted into the tappet whereas if the retaining washer were required to be assembled in place in the motor the conventional type of valve tappets would need to be used.

Referring to Figure 6, it will be seen that I have provided an alternate form of this device for use with V type engines. The parts in this installation which are similar to the parts shown in Figure 1 are given like numerals, in fact, the only essential difference between this device and the one previously illustrated is that instead of inserting the U shaped clips 27 through openings in the side of the cylinder block, a flat washer-type clip 32, illustrated in Figure 8, is provided. The underside of the valve chamber is countersunk at 33 so that when the valve bushing is pressed down slightly from the position shown in Figure 5, the washer 32 may be inserted in a groove 34 formed in the bushing adjacent to the countersunk portion 33. Upon the bushings being resiliently urged by the valve spring upwardly the washer is fixedly secured in position by the countersunk depression thereby retaining the valve bushing in place. In this installation the valve tappet is inserted through the valve chamber opening as is likewise the clip 32; however, the valves, valve bushings, valve springs and spring washers are all assembled outside as units which are inserted through the valve seat openings in the cylinder blocks.

In Figure 7, a replacement unit for the Ford V-8 engine is shown, and it will be seen that to adapt this engine to my improved valve it is only necessary to provide a new valve bushing and retaining clip, the valve, valve spring, spring retaining washer and tappets being the standard Ford parts supplied with such motors.

Among the many advantages arising from the use of my improved device, it may be well to mention that where this device is incorporated into the motor design an exceptionally short valve stem and cylinder block may be used so as to materially lessen the weight of the engine and minimize the warpage on the valve stems. The chief advantage of such structure, however, arises from the ease with which the valves may be assembled or removed from the motor to thus lessen the cost of servicing the engine.

Some changes may be made in the arrangement, construction and combination of the various parts of my improved device without departing from the spirit of my invention and it is my intention to cover by my claims, such changes as may reasonably be included within the scope thereof.

I claim as my invention:

1. A valve unit adapted to be detachably secured in a cylinder block comprising, a valve stem having a valve head on one end thereof and a valve spring retaining member secured to the other end thereof, a valve bushing disposed around said stem, and a valve spring interposed between said retaining member and bushing, said bushing being at least as large in diameter as said spring, whereby said valve stem and spring and bushing and retaining member may be inserted as a unit into a bore in said cylinder block, and means for detachably securing said unit in the cylinder block in such a way that outward axial movement of said unit is prevented after the unit has been so secured.

2. A device, as claimed in claim 1, wherein the valve spring is secured in said unit under compression less than the normal installed compression of said spring.

3. A device as claimed in claim 1, wherein said bushing is provided with an annular groove extending therearound with which a clip is adapted to coact, whereby axial movement of the bushing is prevented.

4. An internal-combustion engine comprising, a cylinder block having a plurality of valve seats formed therein and having cylindrical bores therein each aligned with one of said seats, valve units each comprising a valve and stem and valve bushing and valve spring and valve spring retaining washer adapted to be each inserted as a unit into one of said bores, and means for detachably securing said units into said bores whereby axial movement of said unit may be prevented after said unit is so inserted.

5. A device, as claimed in claim 4, wherein the valve bushing element of each of said units is provided with an annular groove therearound in which a pin inserted transversely through the cylindrical bore coacts to thereby prevent axial movement of said bushing.

6. A device, as claimed in claim 4, wherein said cylinder block is provided with pairs of radially extending openings one on each side of each bore and each opening intersecting the adjacent vertical bore near its periphery, and wherein said block is provided with a longitudinally extending groove intersecting the outer ends of each pair of said openings, whereby a U shaped clip may be used to secure said bushings in place by inserting the arms thereof in said pairs of openings, said clip lying wholly within the lines of said cylinder block.

7. A detachable valve unit comprising, a valve stem having a valve head on one end thereof and a valve spring retaining member secured to the other end thereof, a valve bushing disposed around said stem and a valve spring interposed between said retaining member and bushing, said bushing being at least as large in diameter as said spring and no larger in diameter than said valve head, whereby said valve and bushing and retaining member and spring may be inserted as a unit into a cylindrical bore aligned with a seat for said valve.

8. A unit, as claimed in claim 7, wherein the diameter of said bushing is appreciably larger than said spring and appreciably smaller than said valve head.

9. An internal combustion engine comprising, a cylinder block having a valve seat formed therein and having a cylindrical bore therein aligned with said valve seat, a valve unit comprising a valve and valve bushing and valve spring and valve spring retaining member adapted to be inserted as a unit into said bore, and means for detachably securing the valve bushing portion of said unit in said bore for the purpose described.

HENRY FORD.